(12) United States Patent
Han et al.

(10) Patent No.: US 12,004,179 B2
(45) Date of Patent: Jun. 4, 2024

(54) METHOD AND APPARATUS FOR TRANSMITTING GROUP DOWNLINK CONTROL INFORMATION

(71) Applicant: ZTE CORPORATION, Guangdong (CN)

(72) Inventors: Xianghui Han, Guangdong (CN); Peng Hao, Guangdong (CN); Wei Gou, Guangdong (CN); Chunli Liang, Guangdong (CN); Jing Shi, Guangdong (CN); Shuqiang Xia, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 406 days.

(21) Appl. No.: 17/422,223

(22) PCT Filed: Jan. 13, 2020

(86) PCT No.: PCT/CN2020/071648
§ 371 (c)(1),
(2) Date: Jul. 12, 2021

(87) PCT Pub. No.: WO2020/143823
PCT Pub. Date: Jul. 16, 2020

(65) Prior Publication Data
US 2022/0086811 A1    Mar. 17, 2022

(30) Foreign Application Priority Data
Jan. 11, 2019  (CN) .......................... 201910028706.1

(51) Int. Cl.
*H04H 20/71*   (2008.01)
*H04L 1/1607*  (2023.01)
(Continued)

(52) U.S. Cl.
CPC ........... *H04W 72/23* (2023.01); *H04L 1/1614* (2013.01); *H04L 1/1812* (2013.01); *H04L 5/0055* (2013.01)

(58) Field of Classification Search
CPC .... H04W 72/23; H04L 1/1614; H04L 1/1812; H04L 5/0055; H04L 1/1864; H04L 1/1822; H04L 1/1607
(Continued)

(56) References Cited

U.S. PATENT DOCUMENTS 10,673,593 B2 *  6/2020  Cao ........................ H04L 1/1614
10,863,487 B2 * 12/2020  Yan ...................... H04W 52/325
(Continued)

FOREIGN PATENT DOCUMENTS

CN    108347309 A    7/2018
CN    108809525 A    11/2018
(Continued)

OTHER PUBLICATIONS

Guangdong OPPO Mobile Telecom, R1-1701962 Discussions on uplink grant-free transmission, 3GPP TSG RAN WG1 Meeting #88, Feb. 7, 2017.
(Continued)

*Primary Examiner* — Amancio Gonzalez
(74) *Attorney, Agent, or Firm* — Li & Cai Intellectual Property (USA) Office

(57) ABSTRACT

Embodiments of the present disclosure provide a method and apparatus for transmitting group downlink control information (DCI), wherein the method includes: transmitting group DCI to a user side, wherein the group DCI includes N bit blocks, and each bit block carries indication information including at least one of: an identifier of a user to be fed back (UE-ID), an identifier of a Hybrid Automatic Repeat reQuest (HARQ) process (HARQ-ID) of the user to be fed back, and
(Continued)

a bitmap mapping of K HARQ processes of one user; and the indication information carried in each bit block of the group DCI is configured to indicate feedback information of the corresponding HARQ process.

16 Claims, 5 Drawing Sheets

(51) Int. Cl.
*H04L 1/1812* (2023.01)
*H04L 5/00* (2006.01)
*H04W 72/23* (2023.01)

(58) Field of Classification Search
USPC .......................................................... 370/312
See application file for complete search history.

(56) References Cited

U.S. PATENT DOCUMENTS

| | | | |
|---|---|---|---|
| 11,102,765 B2* | 8/2021 | Fakoorian | H04L 1/1861 |
| 11,233,601 B2* | 1/2022 | Salah | H04L 1/003 |
| 11,317,431 B2* | 4/2022 | Su | H04L 1/1822 |
| 11,356,207 B2* | 6/2022 | Liu | H04L 5/00 |
| 11,368,260 B2* | 6/2022 | Medies | H04L 5/0092 |
| 2018/0367282 A1* | 12/2018 | Li | H04W 72/1268 |
| 2019/0081741 A1* | 3/2019 | Al-Imari | H04L 1/1671 |
| 2019/0097762 A1* | 3/2019 | Jeon | H04L 1/1864 |
| 2020/0099477 A1* | 3/2020 | Al-Imari | H04W 72/1268 |
| 2020/0328840 A1* | 10/2020 | Salah | H04W 24/08 |
| 2021/0099268 A1* | 4/2021 | Yan | H04L 5/0055 |
| 2021/0143944 A1* | 5/2021 | Al-Imari | H04L 1/1896 |
| 2021/0298007 A1* | 9/2021 | Liang | H04L 5/0053 |
| 2022/0240232 A1* | 7/2022 | Zhang | H04L 5/0055 |

FOREIGN PATENT DOCUMENTS

| | | |
|---|---|---|
| WO | WO 2017030602 A1 | 2/2017 |
| WO | WO 2018082572 A1 | 5/2018 |

OTHER PUBLICATIONS

Samsung, "R1-1808789 Potential enhancement for UL grant-free transmission", 3GPP TSG RAN WG1 Meeting #94, Aug. 11, 2018.
China Patent Office, CN201910028706.1 Second Office Action dated Feb. 18, 2023.
WIPO, International Search Report dated Apr. 7, 2020.
MediaTek Inc., "On UL data transmission without grant design and configuration" issued on Oct. 13, 2017, 3GPP TSG RAN WG1 Meeting 90bis.
Huawei, HiSilicon, "The retransmission and HARQ schemes for grant-free" issued on Oct. 14, 2016, 3GPP TSG RAN WG1 Meeting #86bis.

* cited by examiner

METHOD AND APPARATUS FOR TRANSMITTING GROUP DOWNLINK CONTROL INFORMATION

CROSS-REFERENCE TO RELATED APPLICATION

The present application claims priority from the Chinese patent application No. 201910028706.1 filed with the China Patent Office on Jan. 11, 2019, the entire contents of which are incorporated in the present application by reference.

TECHNICAL FIELD

The present disclosure relates to the field of communication technologies, and for example, relates to a method and apparatus for transmitting group downlink control information.

BACKGROUND

The 5th generation mobile communication system (5G) will support multiple service scenarios, such as Enhance Mobile Broadband (eMBB), Ultra-Reliable Low latency Communication (URLLC), massive Machine Type of Communication (mMTC), and so on.

Among the above, URLLC services such as industrial automation, Internet of vehicles, remote control, smart grid, virtual reality and the like has high requirements on latency, and the end-to-end latency is generally less than 1 ms or even 0.5 ms. In order to meet the requirement on latency, especially to reduce the uplink data transmission latency, one method is to configure predefined resources for a user terminal, and the user transmits uplink data in a grant free mode, that is, the uplink data is directly transmitted by the user on predefined resources without transmitting uplink scheduling by a base station.

In the 3rd Generation Partnership Project, Release 15 (3GPP R15) standard protocol, there is no emphasis on ensuring the reliability of transmitting a Physical Uplink Shared Channel (PUSCH) by uplink grant free, especially a high probability of miss detection of PUSCH. According to the protocol, when a base station detects and correctly demodulates a PUSCH on the grant free resources, the base station will not feed back an explicit Acknowledgement (ACK) signaling; and at this time, if a User Equipment (UE) does not receive Downlink Control Information (DCI) of scheduled retransmission within a specified time range, it is determined by default that the base station has correctly received the PUSCH transmitted from the base station itself. However, problems including the following will occur: the reliability for correct detection of PUSCHs by the current base station can hardly reach the strict standard of URLLC, which in turn causes that if the UE transmits a PUSCH but the base station fails to detect it, the base station will not send an explicit ACK according to the current protocol, and after a specified time is expired, the UE will consider that the base station has received the PUSCH correctly. At this time, the failure to trigger UE retransmission will cause packet loss of the PUSCH data information. This may cause potentially serious interruption of URLLC high priority services, and thus is urgent to be solved.

In the related art, no reasonable solution has proposed yet to address the problem that the terminal does not know whether any PUSCH is missed by the base station because the base station does not send ACK after correctly demodulating the PUSCH data information, and thus packet loss of the PUSCH data information may occur.

SUMMARY

Embodiments of the present disclosure provide a method and apparatus for transmitting group downlink control information which can solve at least the problem that the terminal does not know whether any PUSCH is missed by the base station because the base station does not send ACK after correctly demodulating the PUSCH data information, and thus packet loss of the PUSCH data information may occur in the related art.

According to an embodiment of the present disclosure, there is provided a method for transmitting group downlink control information (DCI), including: transmitting group DCI to a user side, wherein the group DCI includes N bit blocks, and each bit block carries indication information including at least one of: an identifier of a user to be fed back (UE-ID), an identifier of a Hybrid Automatic Repeat reQuest (HARQ) process (HARQ-ID) of the user to be fed back, and a bitmap mapping of K HARQ processes of one user; and the indication information carried in each bit block of the group DCI is configured to indicate feedback information of the corresponding HARQ process.

According to another embodiment of the disclosure, there is provided a method for transmitting an indication signal, including: transmitting an indication signal to a user side to indicate feedback information, wherein the indication signal is configured to indicate feedback information of an HARQ process of the user to be fed back, the indication signal occupies K resource units, each of the resource units is a resource block (RB), a resource element group (REG) or a resource element group bundle (REG bundle), and K is a positive integer greater than 0.

According to another embodiment of the disclosure, there is provided a method for transmitting a predetermined sequence, including: transmitting a predetermined sequence at the same time of transmitting grant free Physical Uplink Shared Channels (PUSCHs), wherein resources of the predetermined sequence and the grant free PUSCHs are in one-to-one or one-to-many correspondence.

According to another embodiment of the disclosure, there is provided an apparatus for transmitting group downlink control information (DCI), including: a first transmitting module configured to transmit group DCI to a user side, wherein the group DCI includes N bit blocks, and each bit block carries indication information including at least one of: an identifier of a user to be fed back (UE-ID), an identifier of a Hybrid Automatic Repeat reQuest (HARQ) process (HARQ-ID) of the user to be fed back, and a bitmap mapping of K HARQ processes of one user; and the indication information carried in each bit block of the group DCI is configured to indicate feedback information of the corresponding HARQ process.

According to another embodiment of the disclosure, there is provided an apparatus for transmitting an indication signal, including: a second transmitting module configured to transmit an indication signal to a user side to indicate feedback information, wherein the indication signal is configured to indicate whether an HARQ process of the user to be fed back is correctly received, the indication signal occupies K resource units, each of the resource units is a resource block (RB), a resource element group (REG) or a resource element group bundle (REG bundle), and K is a positive integer greater than 0.

According to another embodiment of the disclosure, there is provided an apparatus for transmitting a predetermined sequence, characterized in including: a third transmitting module configured to transmit a predetermined sequence at the same time of transmitting grant free Physical Uplink Shared Channels (PUSCHs), wherein resources of the predetermined sequence and the grant free PUSCHs are in one-to-one or one-to-many correspondence.

According to another embodiment of the disclosure, there is provided a storage medium having a computer program stored thereon, wherein the computer program is configured to be executed to cause steps of any one of the above method embodiments to be implemented.

According to another embodiment of the disclosure, there is provided an electronic apparatus, including a memory and a processor, characterized in that the memory has a computer program stored thereon, and the processor is configured to execute the computer program to implement steps of any of the method embodiments as described above.

In the embodiments of the disclosure, group DCI is transmitted to a user side, wherein the group DCI includes N bit blocks, and each bit block carries indication information including at least one of: an identifier of a user to be fed back (UE-ID), an identifier of a Hybrid Automatic Repeat reQuest (HARQ) process (HARQ-ID) of the user to be fed back, and a bitmap mapping of K HARQ processes of one user; and the indication information carried in each bit block of the group DCI is configured to indicate feedback information of the corresponding HARQ process. Thereby, the problem that the terminal does not know whether any PUSCH is missed by the base station because the base station does not send ACK after correctly demodulating the PUSCH data information, and thus packet loss of the PUSCH data information may occur in the related art is solved, so that the base station can give an explicit feedback to the User side, or reduce miss rate of the base station, thereby obtaining the technical effect of avoiding packet loss of the PUSCH data information.

BRIEF DESCRIPTION OF THE DRAWINGS

The drawings described herein are intended to provide a further understanding of the present disclosure, and are intended to be a part of the present disclosure. The exemplary embodiments of the present disclosure and the description thereof are used for explaining the present disclosure but do not constitute an undue limitation of the present disclosure. In the drawings.

DETAILED DESCRIPTION

Figure 1:
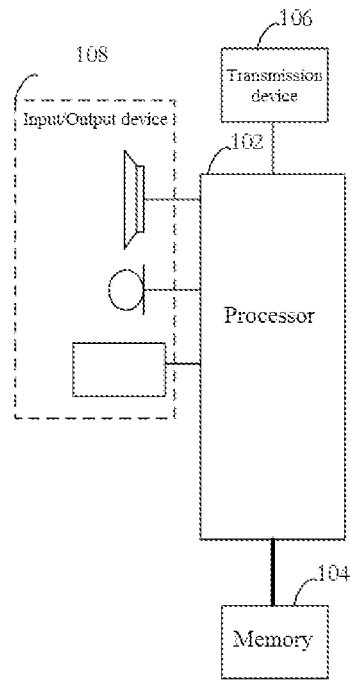
FIG. 1 is a block diagram showing hardware configuration of a mobile terminal for a method for transmitting group DCI according to an embodiment of the present disclosure.

The disclosure will be described in detail below with reference to the drawings in conjunction with the embodiments. It should be noted that the embodiments of the disclosure and features therein may be combined with each other in any manner as long as they are not contradictory.

It should be also noted that the terms "first", "second", and the like in the description, claims and drawings of the disclosure are used for the purpose of distinguishing similar objects instead of indicating a specific order or sequence.

In the current 3rd Generation Partnership Project, Release 15 (3GPP R15) standard protocol, there is no emphasis on ensuring the reliability of transmitting a Physical Uplink Shared Channel (PUSCH) by uplink grant free, especially a high probability of miss detection of PUSCH. According to the current protocol, when a base station detects and correctly demodulates a PUSCH on the grant free resources, the base station will not feed back an explicit Acknowledgement (ACK) signaling; and at this time, if a User Equipment (UE) does not receive Downlink Control Information (DCI) of scheduled retransmission within a specified time range, it is determined by default that the base station has correctly received the PUSCH transmitted from the base station itself. However, problems including the following will occur: the reliability for correct detection of PUSCHs by the current base station can hardly reach the strict standard of URLLC, which in turn causes that if the UE transmits a PUSCH but the base station fails to detect it, the base station will not send an explicit ACK according to the current protocol, and after a specified time is expired, the UE will consider that the base station has received the PUSCH correctly. At this time, the failure to trigger UE retransmission will cause packet loss of the PUSCH data information. This may cause potentially serious interruption of URLLC high priority services, and thus is urgent to be solved.

One solution is to reduce the probability of miss detection of PUSCH, for example, transmitting sequence information, such as a scheduling request (SR) sequence, while transmitting the grant free PUSCH. However, there are further problems to solve, such as how to configure the sequence information and how to handle the situation where the sequence information and/or PUSCH conflict with other channels. In addition, if the probability of miss detection of PUSCH cannot be reduced to be sufficiently low, it is possible to feed back an explicit ACK signaling. For example, ACKs of multiple UEs or multiple processes of one UE are combined and transmitted together by means of group DCI. However, in many URLLC scenarios, there are not many UEs and the data packets are not very large, while the requirement on air interface latency is very low, so ACKs of different UEs and/or processes cannot be combined together.

In view of the above problems, embodiments of the present disclosure provide the following solutions.

Embodiment 1

The method embodiment provided in Embodiment 1 of the present disclosure may be implemented in a mobile terminal, a computer terminal or the like. Taking running on a mobile terminal as an example, FIG. 1 is a block diagram showing hardware configuration of a mobile terminal for a method for transmitting group DCI according to an embodiment of the present disclosure. As shown in FIG. 1, a mobile terminal 10 may include one or more processors 102 (only one is shown in FIG. 1)(the processor 102 may include, but is not limited to, a microprocessor (MCU), or a processing device such as a programmable logic device FPGA) and a memory 104 configured to store data. Optionally, the mobile terminal may further include a transmission device 106 for communication functions and an input/output device 108. It will be understood by those ordinary skilled in the art that the structure shown in FIG. 1 is merely illustrative, and does not form any limitation to the structure of the above mobile terminal. For example, the mobile terminal 10 may include more or fewer components than those shown in FIG. 1, or have a different configuration than that shown in FIG. 1.

The memory 104 may be configured to store a computer program, for example, a software program of application software and a module, such as a computer program corresponding to the method for transmitting group DCI in the embodiments of the present disclosure, and the processor 102 executes the computer program stored in the memory 104 to perform various functional applications and data processings, that is, implement the above method. The memory 104 may include a high speed random access memory and may include a non-transitory memory such as one or more magnetic storage device, flash memory, or other non-transitory solid state memory. In some examples, the memory 104 may further include a memory remotely located relative to the processor 102, which may be connected to the mobile terminal 10 via a network. Examples of such networks include, but are not limited to, the Internet, intranets, local area networks, mobile communication networks, and combinations thereof.

The transmission device 106 is configured to receive or transmit data via a network. Specific examples of the above network may include a wireless network provided by a communication provider of the mobile terminal 10. In an example, the transmission device 106 includes a Network Interface Controller (NIC) that may be connected to another network device through a base station to communicate with the Internet. In an example, the transmission device 106 may be a Radio Frequency (RF) module configured to communicate with the Internet wirelessly.

Figure 2:
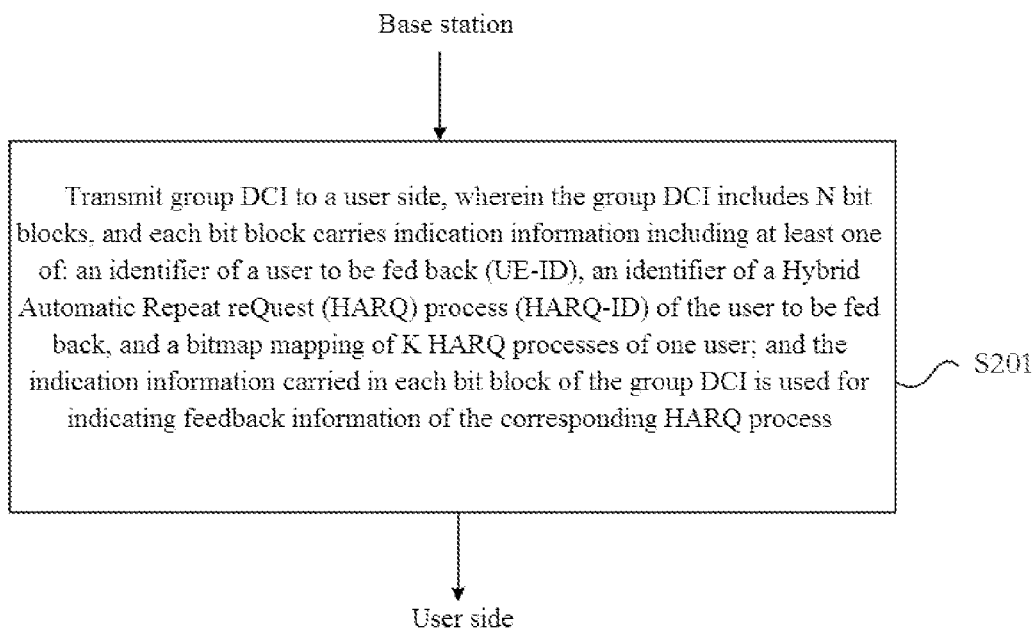
FIG. 2 is a flowchart of a method for locking a target control channel in an embodiment of the present disclosure.

In an embodiment of the present disclosure, there is provided a method for transmitting group DCI. FIG. 2 is a flowchart of a method for locking a target control channel in an embodiment of the present disclosure. As shown in FIG. 2, the method includes the following step S201.

At step S201, transmitting group DCI to a user side, wherein the group DCI includes N bit blocks, and each bit block carries indication information including at least one of: an identifier of a user to be fed back (UE-ID), an identifier of a Hybrid Automatic Repeat reQuest (HARQ) process (HARQ-ID) of the user to be fed back, and a bitmap mapping of K HARQ processes of one user, wherein the indication information carried in each bit block of the group DCI is configured to indicate feedback information of the corresponding HARQ process.

In the above method, by transmitting group DCI to a user side, wherein the group DCI includes N bit blocks, and each bit block carries indication information including at least one of: an identifier of a user to be fed back (UE-ID), an identifier of a Hybrid Automatic Repeat reQuest (HARQ) process (HARQ-ID) of the user to be fed back, and a bitmap mapping of K HARQ processes of one user; and the indication information carried in each bit block of the group DCI is configured to indicate feedback information of the corresponding HARQ process, the problem in the related art that the terminal does not know whether any PUSCH is missed by the base station because the base station does not send ACK after correctly demodulating the PUSCH data information, and thus packet loss of the PUSCH data information may occur is solved, so that the base station can give an explicit feedback to the user side (UE), and the UE can know that the base station may not receive the PUSCH when the UE does not receive the feedback, thereby triggering retransmission and thus obtaining the technical effect of avoiding packet loss of the PUSCH data information.

It should be noted that, in the embodiment of the present disclosure, sending the group downlink control information (group DCI) may refer to sending group DCI indication feedback information to a user side by a base station or a network side after the base station or the network side receives the data information sent from the user side, or sending feedback information to a base station or a network side by the user side after the user side receives the data information sent from the base station or the network side, or sending feedback information to a user side from another user side, which is not limited in this embodiment of the present disclosure.

In an embodiment, before transmitting the group DCI to the user side, the method further includes: setting bit values corresponding to the UE-ID and/or the HARQ-ID in bit blocks of the group DCI, wherein each bit block includes one UE-ID and at least one HARQ-ID, and wherein N is a positive integer greater than 0, and N is a predefined value or a semi-statically configured value.

In an embodiment, the group DCI has a bit size that is an integer multiple of the number of bit blocks N in the group DCI.

In an embodiment, each bit block includes M bit fields indicating M HARQ-IDs of one user, where M is a positive integer greater than 0, and M is a predefined value or a semi-statically configured value.

In an embodiment, each bit block includes a bitmap mapping of M processes of one user, wherein each process corresponds to 1 bit in the bitmap mapping.

In an embodiment, a value of M for different users is configured to be the same or different (different users may be configured with the same value or different values of M).

In an embodiment, the method further includes: setting one-to-one correspondences between the users and indexes of the bit blocks or between the users and indexes of the bit fields.

In an embodiment, the step of setting one-to-one correspondences between the users and the indexes of the bit blocks or the indexes of the bit fields includes: configuring the indexes of the bit blocks or the indexes of the bit fields corresponding to the users semi-statically through a radio resource control (RRC) signaling, wherein the indexes of the bit fields includes indexes for overall numbers of all bit fields contained in all bit blocks.

In an embodiment, the step of setting bit values corresponding to the UE-ID and/or the HARQ-ID in bit blocks of the group DCI includes: selecting P bit blocks for setting the UE-ID of the user to be fed back and/or the HARQ-ID of the user to be fed back, and defining the P bit blocks as valid bit blocks, wherein P is a integer greater than 0; and defining, when P<N, the rest bit blocks as invalid bit blocks, wherein values of the invalid bit blocks are set by at least one of: setting each invalid bit block to the same value as one or more of the valid bit blocks; and setting values of all invalid bit blocks to 0 or 1 or other preset values.

In an embodiment, the method further includes setting bit values of the bitmap mapping in the bit blocks of the group DCI. The step of setting bit values of the bitmap mapping in the bit blocks of the group DCI includes: selecting P bit blocks for setting a receiving state value corresponding to the HARQ process of the user to be fed back, and defining the P bit blocks as valid bit blocks; defining, when P<N, the rest bit blocks as invalid bit blocks, wherein values of the invalid bit blocks are set by at least one of: setting each invalid bit block to the same value as one or more of the valid bit blocks; and setting values of all invalid bit blocks to 0 or 1 or other preset values.

In an embodiment, in the case of more than one invalid bit block, a plurality of invalid bit blocks are set to have the same value.

In an embodiment, the maximum numbers of HARQ processes supported by different users within a single group DCI are the same, wherein the number of bits occupied by the HARQ-ID is determined by the maximum number of HARQ processes.

In an embodiment, the indication information carried in each bit block of the group DCI indicates an Acknowledgement (ACK) message of the corresponding HARQ process.

In order to better understand the technical solutions provided by the embodiments of the present disclosure, the following description is provided by way of specific examples. If the probability of miss detection of PUSCH is high, it is required to perform ACK feedback and provide an ACK feedback scheme. The following sub-embodiments are all different feedback schemes for indicating users and/or HARQ-IDs under group DCI.

Further, a UE-ID of the user to be fed back and an HARQ-ID of the HARQ process are indicated in the group DCI.

Further, there are N bit block indicators (UE-ID, HARQ-ID) in the DCI, each containing one UE-ID and one or more HARQ-IDs.

Further, the DCI size (bit size), or the number of bit blocks N, is a predefined value or a semi-statically configured value. In an embodiment, the DCI size is an integer multiple of the number of bit blocks.

Further, if the number of different users and/or different processes that require feedback is less than the total number of bit blocks in the DCI (or the number of valid bit blocks to be fed back is less than the total number of bit blocks in the DCI), the remaining invalid bit blocks need to be set to a specific value according to at least one of the following rules:

setting the bit in each invalid bit block to the same bit value as at least one of the valid bit blocks, and in an embodiment, setting the bit in each invalid bit block to the value of the first valid bit block;

setting all bits in the invalid bit blocks to 0 or 1 or a predefined bit value; and setting, in the case of more than one invalid bit block, a plurality of the invalid bit blocks to the same value.

The valid bit block refers to a bit block to be fed back corresponding to the actual UE-ID and HARQ-ID.

Further, the maximum numbers of HARQ processes supported by different users within a single group DCI are the same. The number of bits occupied by the HARQ-ID is determined by the maximum number of HARQ processes.

Further, if the UE receives indication information of one or more HARQ-IDs, it is indicated that the HARQ process of the corresponding HARQ-ID is ACK.

Further, if the UE receives indication information of one or more same bit blocks, other bit blocks except the first bit block are considered as invalid bit blocks, or each of the same bit blocks indicates that the HARQ process of the corresponding HARQ-ID is ACK.

Further, the invalid bit block and/or the invalid bit field may also indicate a Negative ACKnowledgment (ACK) message of a specific HARQ process of a specific UE.

For example, the number of bit blocks included in the network configuration DCI is N=5, the number of users in the system is 6, and the maximum number of HARQ processes supported by each user is 8. Then, the number of bits required by each bit block is 6 bits, wherein the first 3 bits represent the UE-ID and the last 3 bits represent the HARQ-ID. Possibly, according to the actual users and processes that require feedback, the bit structure of DCI is as follows: {(UE-ID1+HARQ-ID1), (UE-ID1+HARQ-ID2), (UE-ID2+HARQ-ID1), (UE-ID3+HARQ-ID1), {invalid bit block}}. That is, the user of UE-ID1 has two processes that require feedback, i.e., HARQ-ID1 and HARQ-ID2, while UE-ID2 and UE-ID3 each have one process that requires feedback. The bit information of the remaining one bit block at this time may be set to be the same as the bit information of any one of the previous multiple valid bit blocks, for example, may be the same as the bit information of the first bit block (UE-ID1+HARQ-ID1).

For another example, the number of HARQ-IDs contained in the bit blocks configured for each UE may be different. For example, the structure inside the DCI is: {(UE-ID1+HARQ-ID1+HARQ-ID2+HARQ-ID3), (UE-ID2+HARQ-ID1), (UE-ID3+HARQ-ID1+HARQ-ID2), {invalid bit field}}. That is, the numbers of HARQ-IDs contained in the bit blocks of UEs 1 to 3 are respectively 3, 1 and 2.

In this embodiment, if only one bit field in each bit block indicates one HARQ-ID, there may be a plurality of bit blocks in the DCI that correspond to the same UE-ID but different HARQ-IDs.

According to another implementation of the embodiment of the present disclosure, the correspondence between the UEs and the bit blocks may be a default value set in advance, and the process identifier HARQ-ID of the user to be fed back is indicated in the group DCI. Further, there are N bit blocks in the DCI, each indicating M HARQ-IDs of one user. M and N are both positive integers greater than or equal to 1, and are predefined values or semi-statically configured values.

Further, the users and the bit block indexes are in one-to-one correspondence. In an embodiment, the RRC configures the bit block indexes corresponding to the users semi-statically.

Further, there are M bit fields per bit block indicating M HARQ-IDs of the one user, and the size of each bit field is determined by the maximum number of supported HARQ processes. If 16 processes are supported, each bit field is composed of 4 bits. If M is configured to be 2, each bit block contains 2 bit fields, and each bit field occupies 4 bits, representing one HARQ-ID.

Further, if a certain bit block is invalid, the bits in the bit block are set in at least one of the following manners:

set to the same value as at least one of the valid bit blocks, and in an embodiment, set to a value of the first valid bit block;

set to all 0, or all 1, or set to a predefined bit value, or set to a value indicating an ID of an invalid HARQ process.

If there is more than one invalid bit block, all the invalid bit blocks are set to the same value.

The invalid bit block indicates that the user corresponding to this bit block has no corresponding HARQ process to be fed back.

Further, for a specific bit block, if the number of valid HARQ processes to be fed back is less than M, the remaining invalid bit fields are set to a specific value determined according to at least one of the following rules:

setting each invalid bit field to the same bit value as at least one valid bit field, and in an embodiment, setting the bit value of the invalid bit field to a value of the first valid bit field;

setting all bits in the invalid bit fields to 0, or 1, or a predefined bit value, or a value indicating an ID of an invalid HARQ process.

If more than one invalid bit field is preset, all the invalid bit fields are set to the same value.

The valid bit field is a bit field corresponding to an actual HARQ process to be fed back.

Further, the same maximum number of HARQ processes is supported for different users within a single DCI.

Further, the number of bits occupied by the HARQ-ID is determined by the maximum number of HARQ processes, or by the maximum number of HARQ processes+X, where X is an integer. In an embodiment, X=1.

Further, if the UE receives indication information of one or more HARQ-IDs, it is indicated that the HARQ process of the corresponding HARQ-ID is ACK.

Further, if the UE receives indication information of one or more same bit fields, other bit fields except the first bit field are considered as invalid bit fields, or each of the same bit fields indicates that the HARQ process of the corresponding HARQ-ID is ACK.

Further, the invalid bit block and/or the invalid bit field may indicate an NACK message of a specific HARQ process of a specific UE.

Further, if the number of users or the number of bit blocks N=1, a Cell-Radio Network Temporary Identifier (C-RNTI) may be used for scrambling. That is, it may be considered as UE-specific DCI.

Further, if the number of users or the number of bit blocks is greater than or equal to 1, a group Radio Network Temporary Identifier (RNTI) may be used for scrambling. That is, it may be considered as group DCI.

For example, the number of bit blocks included in the network configuration DCI is N=5, the number of users in the system is 10, the maximum number of HARQ processes supported by each user is 7, and the configured bit blocks each have M=2 bit fields. Then, the number of bits required by each bit block is 6 bits, wherein the first 3 bits represent HARQ-ID1 and the last 3 bits represent HARQ-ID2. The network configures the UE-ID and the corresponding bit block index position in one piece of group DCI. Possibly, according to the actual users and processes that require feedback, the DCI may have a bit structure of: {{invalid bit block} 1, (HARQ-ID1+HARQ-ID2) UE2, (HARQ-ID1+ invalid bit field) UE3, (HARQ-ID1+HARQ-ID2) UE4, {invalid bit block} 2}. That is, there are actually 3 UEs that need ACK feedback, corresponding to the 2nd, 3rd, and 4th bit blocks in the DCI, respectively. The UEs corresponding to the 1st and 5th bit blocks have no feedback to be sent to. The bits at the positions of the 1st and 5th bit blocks may be set to 111 (indicating that the 8th process is an invalid process). Meanwhile, UE2 and UE4 each have 2 HARQ processes that require feedback, while UE3 only has one process requiring feedback, and the invalid bit field is set to the bit value representing an invalid process, i.e. 111 in this example.

According to another implementation of the embodiment of the disclosure, the process identifier HARQ-ID of the user to be fed back is indicated in the DCI. Further, there are N bit blocks in the DCI, each bit block indicating M HARQ-IDs of one user. Wherein M and N are both positive integers greater than or equal to 1. The value M is independently configured for each bit block, i.e., different bit blocks may be configured with the same value or different values of M.

Further, there are M bit fields per bit block indicating M HARQ-IDs of the one user, and the size of each bit field is determined by the maximum number of supported HARQ processes. If 16 processes are supported, each bit field is composed of 4 bits. If M is configured to be 2, each bit block contains 2 bit fields, and each bit field occupies 4 bits and represents one HARQ-ID.

Further, the users and the bit block indexes or bit fields indexes are in one-to-one correspondence. In an embodiment, the RRC configures the bit block index or bit field indexes corresponding to the users semi-statically. The bit field indexes are indexes of overall numbers of all bit fields contained in all bit blocks.

Further, if a certain bit block is invalid, the bits in the bit block are set to a value including at least one of:

the same value as at least one of the valid bit blocks, and in an embodiment, set to a value of the first valid bit block;

all 0, or all 1, or a predefined bit value, or a value indicating an ID of an invalid HARQ process.

If there is more than one invalid bit block, all the invalid bit blocks are set to the same value.

The invalid bit block indicates that the user corresponding to this bit block has no corresponding HARQ process to be fed back.

Further, for a specific bit block, if the number of valid HARQ processes to be fed back is less than M, the remaining invalid bit fields are set to a specific value. The specific value is set in at least one of the following manners:

setting each invalid bit field to the same bit value as at least one valid bit field, and setting the bit value of the invalid bit field to a value of the first valid bit field;

setting all bits in the invalid bit fields to 0, or 1, or a predefined bit value, or a value indicating an ID of an invalid HARQ process.

If more than one invalid bit field is preset, all the invalid bit fields are set to the same value.

The valid bit field is a bit field to feed back corresponding to an actual HARQ process.

Further, the maximum numbers of HARQ processes supported by different users within a single group DCI are the same.

Further, the number of bits occupied by the HARQ-ID is determined by the maximum number of HARQ processes, or by the maximum number of HARQ processes+X, where X is an integer. In an embodiment, X=1.

Further, if the UE receives indication information of one or more HARQ-IDs, it is indicated that the HARQ process of the corresponding HARQ-ID is ACK.

Further, if the UE receives indication information of one or more same bit fields, other bit fields except the first bit field are considered as invalid bit fields, or each of the same bit fields indicates that the HARQ process of the corresponding HARQ-ID is ACK.

Further, the invalid bit block and/or the invalid bit field may indicate an NACK message of a specific HARQ process of a specific UE.

Further, if the number of users or the number of bit blocks N=1, C-RNTI may be used for scrambling. That is, it may be considered as UE-specific DCI.

Further, if the number of users or the number of bit blocks is greater than or equal to 1, group RNTI may be used for scrambling. That is, it may be considered as group DCI.

For example, when the number of bit blocks included in the network configuration DCI is N=4, the number of users in the system is 10, the maximum number of HARQ processes supported by each user is 7, and the configured bit blocks each have 1, 2, 3 and 2 bit fields, respectively, each bit block requires 3 bits. The network configures the UE-ID and the corresponding bit field index position in one piece of group DCI.

Possibly, according to the actual users and processes that require feedback, the DCI may have a bit structure of: {(HARQ-ID1) UE1, (HARQ-ID1+HARQ-ID2) UE2, (HARQ-ID1+HARQ-ID2+HARQ-ID3) UE3, {invalid bit field1, invalid bit field2}}. That is, there are actually 3 UEs that need ACK feedback, corresponding to the 1st, 2nd and 3rd, bit blocks in the DCI, respectively. Wherein the UE corresponding to the 4th bit block has no ACK feedback to be sent to. Moreover, the UEs 1 to 4 correspond to the bit field indexes 1, 2, 4, and 7, respectively. Note that herein, the index number starts from 1. In general, the numbering herein may also start from 0, but different numbering does not mean different solutions. Both bit fields of the 4th bit block may be set to 111 (indicating that the 8th process is an invalid process).

One application scenario of the above embodiment is: in a Frequency-division Duplex (FDD) mode, if a user data packet is large, multiple Transport Block (TB) processes need to be characterized at the same time; or in a Time-division Duplex (TDD) mode, multiple uplinks correspond to one downlink feedback position.

According to another implementation of the embodiment of the present disclosure, there are N bit blocks in one piece of group DCI, each of which is used for indicating bitmap mapping of M processes for one user. Bits are mapped one to one, and each bit corresponds to one process (in Embodiments 1 to 2, three bits correspond to one process) to save bits. N is obtained by a high level semi-static configuration or is predefined. M is obtained by a high level semi-static configuration or is predefined. M is an integer greater than or equal to 1.

For one UE, each process corresponds to 1 bit in the bitmap mapping.

1 indicates that the corresponding process is ACK, and 0 indicates that the corresponding process is NACK or Discontinuous Transmission (DTX).

The M processes are M PUSCH processes closest to the DCI.

The M PUSCH processes closest to the DCI need to satisfy a certain timing condition.

The timing condition is that a distance between the position of the last symbol of the DCI and a first symbol of each of the M PUSCHs is larger than time T.

Further, the value of M corresponds to different bit blocks or independent configuration of different users, i.e. the value of M may vary.

Further, the users and the bit block indexes are in one-to-one correspondence. In an embodiment, the RRC configures the bit block index corresponding to the user semi-statically.

Further, if all bits in a bit block are 0, it is indicated that the bit block is an invalid bit block, or NACK or DTX.

Further, each bit block may contain a UE-ID (user identifier).

Further, the network may be configured to perform semi-static handover between the above solution and the solution of Embodiment 1. This depends on at least the number of HARQ processes requiring to be fed back in each bit block.

For example, the number of bit blocks included in the network configuration DCI is N=6, the number of users in the system is 10, and the maximum number of HARQ processes supported by each user is 8, but M configured for each user is 2, then each bit block has a size of 2 bits. The 2 bits map 2 PUSCHs that are closest to the DCI and satisfy the timing relationship, respectively. Possibly, according to the actual users and processes that require feedback, the DCI may have a bit structure of: {(01) UE1, (11) UE2, (11) UE3, {00} UE4, {00} UE5, {00} UE6}. That is, there are actually 3 UEs that need ACK feedback, corresponding to the 1st, 2nd and 3rd, bit blocks in the DCI, respectively, where only one of the 2 PUSCH processes of the bit block corresponding to UE1 is correctly demodulates, that is, is fed back an ACK. The 2 PUSCH processes of the bit blocks corresponding to each of the UEs 2 to 3 is fed back an ACK. If the last three bit blocks all have the bit information of 0, it is indicated that the UEs 4 to 6 do not have ACK to be sent to (maybe the UE has sent ACK but the base station fails to detect it, or the UE does not even send ACK).

According to another implementation of the embodiment of the present disclosure, there are N bit blocks in one piece of group DCI, each of which containing resource indication information (resource allocation information). The resource indication information contains N1 bits, where N1 represents the number of indicated resources. Specifically, bitmap mapping is performed on N1 resources.

Further, the N bit blocks in the DCI respectively represent different PUSCH processes or resource allocation information of different UEs.

The UE judges whether the indicated resources overlap with the resources configured by the UE itself; if so, it is considered that an ACK has been fed back.

For example, resources in the system or resources allocated to grant free are divided into 4 sections, each of which is represented by a 4-bit bitmap. For example, the DCI structure is $\{(0001)^{UE1}, (0011)^{UE2}, (0001)^{UE3}, (0011)^{EU4}\}$, i.e., a bit block including 4 UEs. Each bit block indicates resource indication information of one PUSCH process, wherein (0001) indicates the 1st resource section. If resources occupied by the PUSCH actually transmitted from a UE are the same as or overlap with the resources above, it indicates ACK. Otherwise, it indicates NACK or DTX.

In an embodiment, there is further provided an apparatus for transmitting group DCI and configured to implement the foregoing embodiments and implementations; details which have been described will not repeated here. As used herein, the term "module" may be a combination of software and/or hardware that can realize a preset function. Although the apparatus described in the embodiments below may be implemented in software, an implementation in hardware or a combination of software and hardware is also possible and contemplated.

Figure 3:
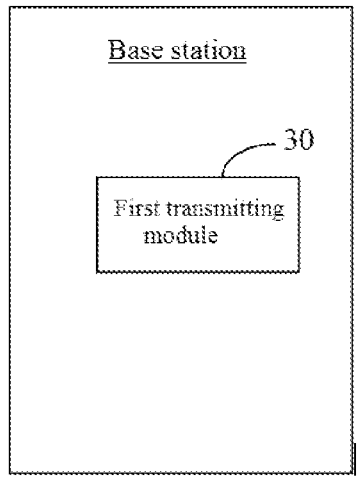
FIG. 3 is a block diagram of an apparatus for transmitting group DCI according to an embodiment of the present disclosure.

FIG. 3 is a block diagram of an apparatus for transmitting group DCI according to an embodiment of the present disclosure. As shown in FIG. 3, the apparatus includes: a first transmitting module 30 configured to transmit group DCI to a user side, wherein the group DCI includes N bit blocks, and each bit block carries indication information including at least one of: an identifier of a user to be fed back (UE-ID), an identifier of a Hybrid Automatic Repeat reQuest (HARQ) process (HARQ-ID) of the user to be fed back, and a bitmap mapping of K HARQ processes of one user; and the indication information carried in each bit block of the group DCI is configured to indicate feedback information of the corresponding HARQ process.

With this apparatus, the problem that the terminal does not know whether any PUSCH is missed by the base station because the base station does not send ACK after correctly demodulating the PUSCH data information, and thus packet loss of the PUSCH data information may occur in the related art is solved, so that the base station can give an explicit feedback to the user side (UE), and the UE can know that the base station may not receive the PUSCH when the UE does not receive the feedback, thereby triggering retransmission and thus obtaining the technical effect of avoiding packet loss of the PUSCH data information.

Embodiment 2

Figure 4:
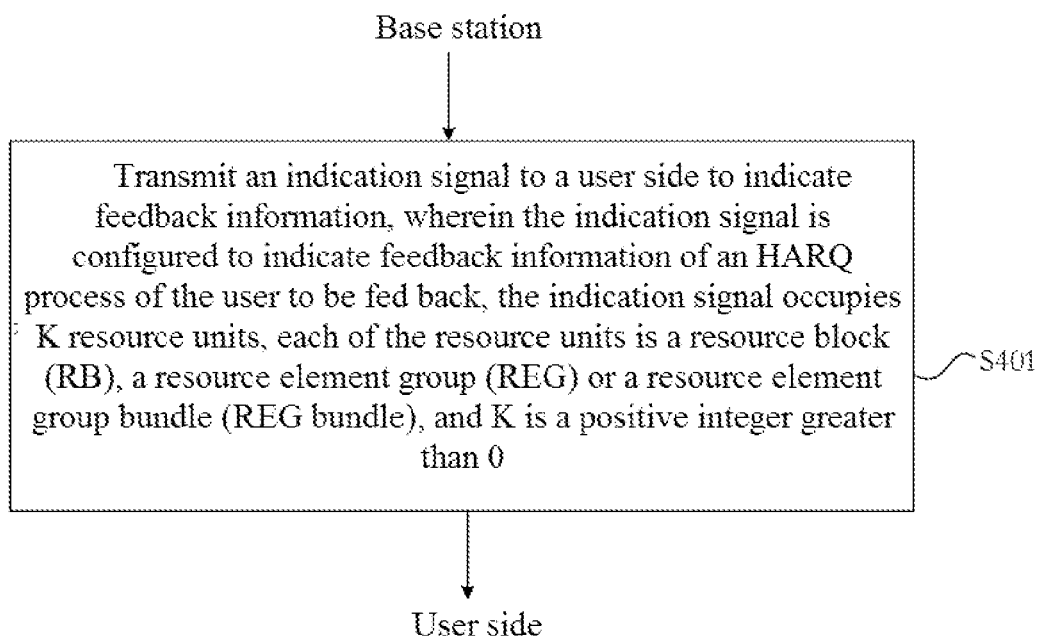
FIG. 4 is a flowchart of a method for transmitting an indication signal according to an embodiment of the present disclosure.

In an embodiment of the present disclosure, there is provided a method for transmitting an indication signal. FIG. 4 is a flowchart of a method for transmitting an indication signal according to an embodiment of the present disclosure. As shown in FIG. 4, the method includes the following step S401.

At step S401, transmitting an indication signal to a user side to indicate feedback information, wherein the indication signal is configured to indicate feedback information of an HARQ process of the user to be fed back, the indication signal occupies K resource units, each of the resource units is a resource block (RB), a resource element group (REG) or a resource element group bundle (REG bundle), and K is a positive integer greater than 0.

In the above method, by transmitting an indication signal to a user side to indicate feedback information, wherein the indication signal is configured to indicate feedback information of an HARQ process of the user to be fed back, the indication signal occupies K resource units, each of the resource units is a resource block (RB), a resource element group (REG) or a resource element group bundle (REG bundle), and K is a positive integer greater than 0, the problem that the terminal does not know whether any PUSCH is missed by the base station because the base station does not send ACK after correctly demodulating the PUSCH data information, and thus packet loss of the PUSCH data information may occur in the related art is solved, so that the base station can give an explicit feedback to the user side (UE), and the UE can know that the base station may not receive the PUSCH when the UE does not receive the feedback, thereby triggering retransmission and thus obtaining the technical effect of avoiding packet loss of the PUSCH data information.

It should be noted that, in the embodiment of the present disclosure, sending the group downlink control information (group DCI) may refer to sending group DCI indication feedback information to a user side by a base station or a network side after the base station or the network side receives the data information sent from the user side, or sending feedback information to a base station or a network side by the user side after the user side receives the data information sent from the base station or the network side, or sending feedback information to a user side from another user side, which is not limited in this embodiment of the present disclosure.

In an embodiment, the mapping structure of the indication signal is characterized in that the occupied resource units are K continuous resource units; or, the K resource units are discrete and discontinuous resource units in a time-frequency domain.

In an embodiment, the step of transmitting the indication signal to the user side to indicate feedback information includes: defining X−1 or X or X+1 sequences to represent different types of feedback information, wherein X=2^s, and s represents a bit number characterized by the sequences.

In an embodiment, the step of transmitting the X−1 or X or X+1 sequences to the user side includes: selecting one of the X−1 or X or X+1 sequences for transmission according to a state of the feedback information.

In an embodiment, the feedback information includes various combinations of feedback states, wherein the various combinations of feedback states include at least one of: a combination of {ACK, NACK and DTX}, a combination of {ACK, NACK}, a combination of {ACK, DTX}, and {ACK} alone.

In an embodiment, the indication signal has a length L, and the indication signal is composed of A subsequences, where each of A and L is a positive integer greater than 0.

In an embodiment, the number of subsequences composing the indication signal conforms to at least one of the following cases: the indication signal is composed of A=1 subsequence(s), and L represents the number of valid resource elements contained in all resource units, wherein the valid resource elements are all remaining resource elements after deducting the resource elements occupied by a demodulation reference signal (DMRS) or all resource elements in all resource units; the indication signal is composed of A=A2 subsequence(s), A2 represents the number of time domain symbols occupied by the indication signal, where L represents the number of valid resource elements contained in all resource units of a single symbol, and the valid resource elements are all remaining resource elements after deducting the resource elements occupied by DMRS or all resource elements in all resource units; the signal is composed of A=K subsequences, where L represents the number of valid resource elements contained in a single resource unit, and the valid resource elements are all remaining resource elements after deducting the resource elements occupied by DMRS or all resource elements in all resource units; the signal is composed of A=K/A2 subsequence(s), where A2 represents the number of time domain symbols occupied by the feedback signal, L represents the number of valid resource elements contained in a single resource unit of a single symbol, and the valid resource elements are all remaining resource elements after deducting the resource elements occupied by DMRS or all resource elements in all resource units.

In an embodiment, among the sequences, there is a sequence indicating that data information transmitted by the user side is not detected by a base station.

In order to better understand the technical solutions in the embodiments of the present disclosure, the following description is provided by way of specific examples. Feedback of transmission of PUSCHs, particularly grant free PUSCHs, may be implemented in the form of a sequence. The time-frequency domain mapping is characterized in that:

the signal sequence occupies K resource units, and each of the resource units is a resource block (RB), a resource element group (REG) or a resource element group bundle (REG bundle).

The sequence has the same mapping structure in the time-frequency domain as the PDCCH.

N1−1 or N1 or N1+1 sequences are adopted to represent different types of feedback information. N1=2^s, where s represents a bit number characterized by the sequences.

One of the N1−1 or N1 or N1+1 sequences is selected to be transmitted according to the transmitted information state.

The feedback information represents IDs of one or more HARQ processes; or, represents a combination of multiple feedback states.

The combination of multiple feedback states includes a combination of {ACK, NACK, DTX}; or a combination of {ACK, NACK}; or a combination of {ACK, DTX}; or {ACK} alone.

Among the sequences, there is a sequence indicating DTX (no uplink PUSCH is detected by the base station).

The signal or sequence consists of A subsequences (the transmitted long sequence consists of A subsequences), and the (each transmitted) sequence has a length L.

Possible mode 1: the signal consists of A=1 subsequence. L represents the number of valid resource elements (RE) contained in all resource units. The valid resource elements are all remaining REs after deducting the REs occupied by a demodulation reference signal (DMRS) or all resource elements in all resource units.

Possible mode 2: the signal is composed of A=A2 subsequences, where A2 represents the number of time domain symbols occupied by the feedback signal, where L represents the number of valid REs contained in all resource units of a single symbol. The valid resource elements are all remaining REs after deducting the REs occupied by a DMRS or all resource elements in all resource units.

Possible mode 3: the signal is composed of A=K (in consistence with the previous K resource units) subsequences, where L represents the number of valid REs contained in a single resource unit. The valid resource elements are all remaining REs after deducting the REs occupied by a DMRS or all resource elements in the resource unit.

Possible mode 4: the signal is composed of A=K/A2 subsequences, where A2 represents the number of time domain symbols occupied by the feedback signal, L represents the number of valid REs contained in a single resource unit of a single symbol. The valid resource elements are all remaining REs after deducting the REs occupied by a DMRS or all resource elements in the resource unit.

If the resource mapping is implemented in a non-interleaving mode, the above possible mode 1 or 2 is preferred. If the resource mapping is implemented in an interleaving mode, the above possible mode 3 or 4 is preferred.

In combination with Embodiments 1 and 2, a type of the feedback signal is determined according to a service type or RRC configuration or in a predefined manner.

The type includes one or more of Group DCI, UE specific DCI and sequence.

For example, for a feedback supporting two of the above types simultaneously, one of the types may be RRC enabled.

For example, 8 sequences are defined, which may represent 8 states of 3 bits, such as one HARQ-ID for indicating one UE, i.e. one HARQ-ID in this example takes 3 bits; or 3 bits for bitmap indicating three HARQ processes, for example, the latest three PUSCHs meeting the processing time requirement, or three PUSCHs configured in the TDD system and corresponding to the associated sequence feedback. At this time, in implementation, a DTX detection threshold is usually set, and the UE first determines whether the energy of the sequence is greater than the detection threshold to which the sequence belongs. If so, it is considered that the ACK feedback of the corresponding HARQ process is received; if not, it is considered that no related feedback signal is detected.

For example, 7 sequences are defined, which may represent 7 types of information states of 3 bits, such as one HARQ-ID indicating one UE, i.e. one HARQ-ID in this example taking 3 bits to represent processes 0 to 6; or 3 bits for bitmap indicating three HARQ processes, for example, the latest three PUSCHs meeting the processing time requirement, or three PUSCHs configured in the TDD system and corresponding to the associated sequence feedback. Feedback is performed as long as one of the 3 PUSCHs is ACK, and feedback is not required when all the 3 PUSCHs are NACK. In other words, there are 7 states corresponding to 7 sequences one by one.

For another example, 9 sequences are defined, which may represent 9 information states, such as one HARQ-ID for indicating one UE, i.e. one HARQ-ID in this example may represent a range of 0 to 8. Optionally, one of the sequences represents a DTX sequence that is configured to, feedback, if the base station does not detect PUSCH transmission at the corresponding time domain position or process, the sequence to the time domain position or process. That is, it indicates that the base station has not detected any PUSCH. Retransmission may be triggered if the UE actually sends PUSCH, and in an embodiment, a grant free retransmission of PUSCH is triggered. If the UE does not actually send the PUSCH, the UE does not perform any corresponding operation when receiving the DTX sequence. Further, in the solution of this embodiment, it is not necessary to provide a threshold for the detection sequence at the UE side.

The above embodiment provides a signal structure of downlink feedback ACK, and defines a time domain position of the feedback information in units. According to another implementation of the embodiment of the present disclosure, a time domain transmission position of the feedback signal is defined in the TDD system by at least one of the following modes:

Mode 1: defining a fixed processing time N', which is in units of symbols. The time domain position of the feedback signal is a first valid feedback position after N' symbols behind the last symbol of the PUSCH.

Mode 2: configuring the corresponding feedback timing while configuring TDD uplink and downlink configurations. Considering that neither DL nor flexible is used for UL grant free transmission, a corresponding timing position is configured for each uplink position.

Specifically, a timing value may be defined for each uplink slot or PUSCH transmission occasion.

Alt1: the timing unit is symbol/slot or the like, and the latest PDCCH occasion satisfying the indicated timing relationship is used as a feedback position.

For example, the uplink and downlink configuration period of a TDD system every 2 ms is {D, D, U, U}, where D represents a downlink slot of 0.5 ms, and U represents an uplink slot of 0.5 ms. Then, the ACK feedback timings corresponding to the PUSCH resources in the two uplink slots may be configured to be {2,1} slots, respectively, which respectively indicate the feedback timings corresponding to the first U and the second U in the period, i.e., indicate which slot after the U slot is the corresponding feedback position. In this example, the feedback positions corresponding to the two U slots are each the first D slot position thereafter. If the slot contains a PDCCH transmission occasion, the first transmission occasion is the transmission position of the downlink feedback signal thereof. If the slot does not contain any PDCCH transmission occasion, the first transmission occasion is delayed to the first valid PDCCH transmission occasion thereafter.

Alt2: the PDCCH occasion is taken as a unit, and the Kth PDCCH occasion from the beginning of PUSCH is indicated as a feedback position.

For example: each of PUSCH1 and PUSCH2 is configured with a K value of 1, it means that the transmission is performed at the first available PDCCH position after the PUSCH is transmitted, that is, at a time-frequency position of PDCCH1. PUSCH3 is configured with a K value of 2, it means that the transmission is performed at the second available PDCCH position after the PUSCH is transmitted, that is, at a time-frequency position of PDCCH2.

| PUSCH transmission occasion | PUSCH1 | PUSCH2 | PUSCH3 | | |
|---|---|---|---|---|---|
| PDCCH transmission occasion | | | | PDCCH1 | PDCCH2 |
| Timing (in units of PDCCH occasion) | 1 | 1 | 2 | | |

In the above embodiment, the transmission position of the feedback information is indicated taking PDCCH as an example, and if the feedback information is a sequence signal, the feedback position may be the PDCCH position described above, or similarly, may be a configured position of sequence transmission occasion.

In this embodiment, there is further provided an apparatus for transmitting an indication signal to implement the above embodiments and preferred implementations; details which have been described will not be repeated here. As used herein, the term "module" may be a combination of software and/or hardware that can realize a preset function. Although the apparatus described in the embodiments below may be implemented in software, an implementation in hardware or a combination of software and hardware is also possible and contemplated.

Figure 5:
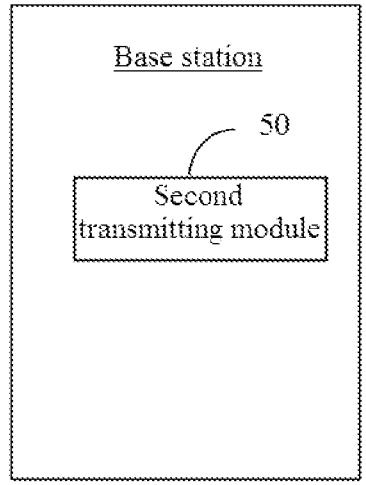
FIG. 5 is a block diagram of an apparatus for transmitting an indication signal according to an embodiment of the present disclosure.

FIG. 5 is a block diagram of an apparatus for transmitting an indication signal according to an embodiment of the present disclosure. As shown in FIG. 5, the apparatus includes: a second sending module 50 configured to transmit an indication signal to a user side to indicate feedback information, wherein the indication signal is configured to indicate feedback information of an HARQ process of the user to be fed back, the indication signal occupies K resource units, each of the resource units is a resource block (RB), a resource element group (REG) or a resource element group bundle (REG bundle), and K is a positive integer greater than 0.

With the above apparatus, the problem that the terminal does not know whether any PUSCH is missed by the base station because the base station does not send ACK after correctly demodulating the PUSCH data information, and thus packet loss of the PUSCH data information may occur in the related art is solved, so that the base station can give an explicit feedback to the user side (UE), and the UE can know that the base station may not receive the PUSCH when the UE does not receive the feedback, thereby triggering retransmission and thus obtaining the technical effect of avoiding packet loss of the PUSCH data information.

Embodiment 3

Figure 6:
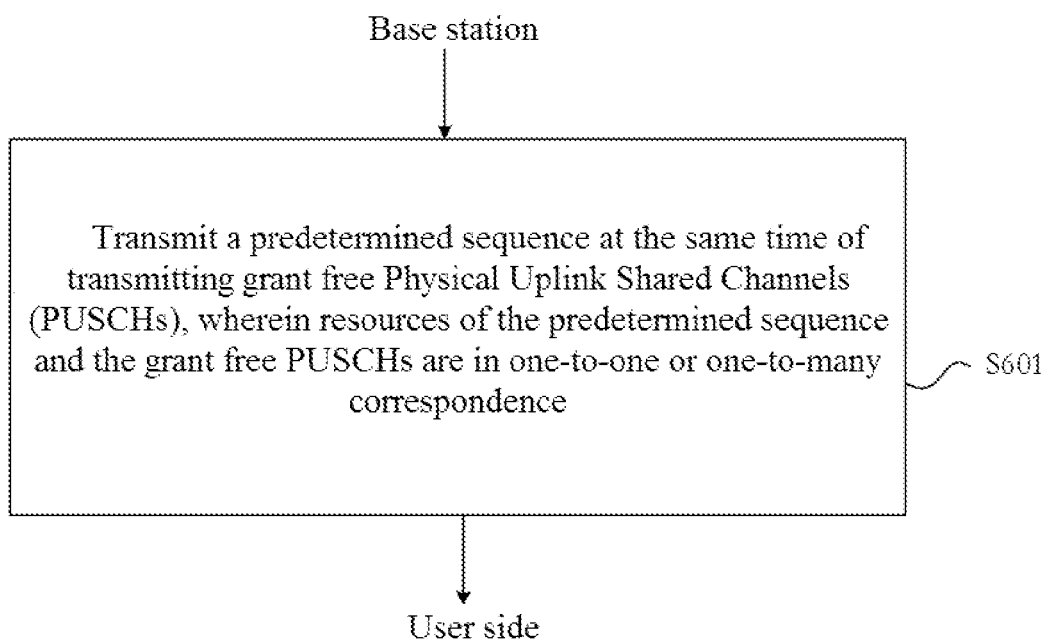
FIG. 6 is a flowchart of a method for transmitting a predetermined sequence in an embodiment of the present disclosure.

In an embodiment of the present disclosure, there is provided a method for transmitting a predetermined sequence. FIG. 6 is a flowchart of a method for transmitting a predetermined sequence in an embodiment of the present disclosure. As shown in FIG. 6, the method includes the following step S601.

At step S601, transmitting a predetermined sequence at the same time of transmitting grant free Physical Uplink Shared Channels (PUSCHs), wherein resources of the predetermined sequence and the grant free PUSCHs are in one-to-one or one-to-many correspondence.

In the above method, by transmitting a predetermined sequence at the same time of transmitting grant free Physical Uplink Shared Channels (PUSCHs), wherein resources of the predetermined sequence and the grant free PUSCHs are in one-to-one or one-to-many correspondence, the problem that the terminal does not know whether any PUSCH is missed by the base station because the base station does not send ACK after correctly demodulating the PUSCH data information, and thus packet loss of the PUSCH data information may occur in the related art is solved, so that the base station can give an explicit feedback to the user side (UE), and the UE can know that the base station may not receive the PUSCH when the UE does not receive the feedback, thereby triggering retransmission and thus obtaining the technical effect of avoiding packet loss of the PUSCH data information.

It should be noted that, in the embodiment of the present disclosure, sending the group downlink control information (group DCI) may refer to sending group DCI indication feedback information to a user side by a base station or a network side after the base station or the network side receives the data information sent from the user side, or sending feedback information to a base station or a network side by the user side after the user side receives the data information sent from the base station or the network side, or sending feedback information to a user side from another user side, which is not limited in this embodiment of the present disclosure.

In an embodiment, prior to transmitting the predetermined sequence, the method further includes: configuring the resources of the predetermined sequence as one scheduling request (SR) resource in a system, or physical random access channel (PRACH) resources, or DMRS resources.

In an embodiment, identifiers (IDs) of the resources of the predetermined sequence are in one-to-one correspondence with IDs of the grant free PUSCHs.

In an embodiment, the resource of the predetermined sequence has the same configuration period as the corresponding grant free PUSCH.

In an embodiment, an offset between configured starting position of the resource of the predetermined sequence and configured starting position of the corresponding grant free PUSCH is less than M1 symbols, where M1 is an integer.

In an embodiment, transmission of the predetermined sequence is triggered with data transmission on the user side.

In an embodiment, prior to transmitting the predetermined sequence, the method further includes: setting a proprietary sequence to configure resources as the predetermined sequence, wherein resources of the proprietary sequence are subjected to information configuration in at least one of the following aspects: a starting position of a sequence, the number of time domain symbols of a sequence, a cyclic shift or initial cyclic shift of a sequence; a sequence length, an initial resource block index, the number of resource blocks occupied by a sequence, whether a comb structure is adopted for transmission, and a sequence period.

In an embodiment, the starting position of the proprietary sequence is in units of time domain symbols, or an offset between the starting position of the proprietary sequence and a first symbol of the PUSCH is less than M2 symbols, where M2 is an integer.

In an embodiment, the resource of the proprietary sequence has an offset of 0 or 1 from the first symbol of the PUSCH.

In an embodiment, the number of time domain symbols for the resource of the proprietary sequence is fixed to 1.

In an embodiment, the resource of the proprietary sequence occupies 1 or 4 resource blocks, or occupies the same number of resource blocks as the PUSCH.

In an embodiment, the transmission of the proprietary sequence is triggered along with transmission of grant free data on the user side.

In an embodiment, when the resources of the predetermined sequence and/or the PUSCH conflicts with another channel, at least one of the following operations is performed: dropping the another channel, and transmitting the predetermined sequence and the PUSCH; and dropping the another channel, and carrying all or part of data information of the another channel on the PUSCH for transmission.

In an embodiment, the predetermined sequence and the PUSCH are taken as a combined PUSCH, and at least one of the following operations is performed when another channel conflicts with the combined PUSCH: dropping the another channel, and transmitting the combined PUSCH; and dropping the another channel, and carrying all or part of data information of the another channels on the PUSCH for transmission.

In an embodiment, the another channel includes a physical uplink control channel (PUCCH) that carries information including at least one of: SR, HARQ-ACK and CSI.

In order to better understand the technical solutions in the embodiments of the present disclosure, the following description is provided by way of specific examples.

To reduce the probability of miss detection of grant free PUSCH, a predetermined sequence may be transmitted at the same time when the grant free PUSCH is transmitted, where the sequence may optionally be an SR sequence. Further, a resource configuration method of the sequence is required to be defined.

One method is to reuse an SR configuration resource, i.e., the resource of the predetermined sequence is configured as one SR resource in the system.

Further, resources of the predetermined sequence are in one-to-one correspondence with grant free PUSCHs. Specifically, resource IDs of the predetermined sequence are in one-to-one correspondence with grant free PUSCH IDs.

Further, the resource of the predetermined sequence has the same configuration period as the corresponding grant free PUSCH.

Further, an offset between configured starting position of the resource of the predetermined sequence and configured starting position of the corresponding grant free PUSCH is less than M1 symbols, where M1 is an integer, and preferably, M1=0.

Further, if there is data transmission on the UE, transmission of the sequence is triggered.

Figure 7:
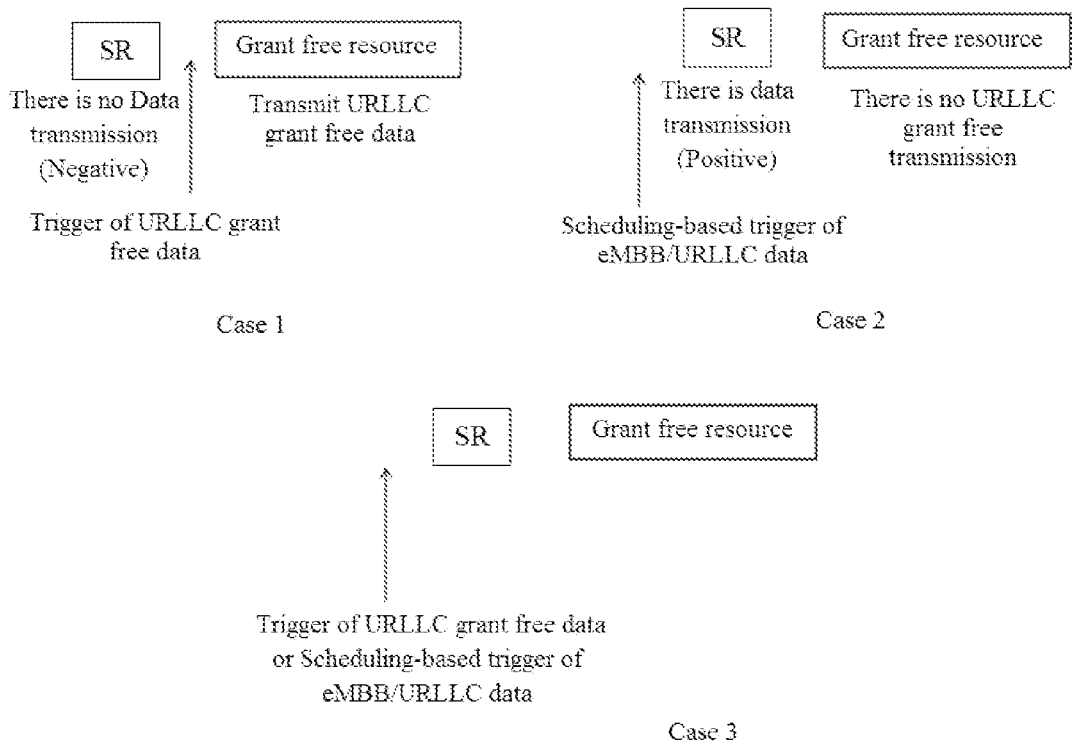
FIG. 7 is a schematic diagram showing transmission of SR and PUSCH under different data triggering conditions according to an embodiment of the present disclosure.

FIG. 7 is a schematic diagram showing transmission of SR and PUSCH under different data triggering conditions according to an embodiment of the present disclosure. Denser SR resources or a good period matching of the SR and the grant free PUSCH is required to match the PUSCH transmission; otherwise the following problems may occur: for Case 1 in FIG. 7: no matching SR can be found; for Case 2: unnecessary UL grant transmission may be triggered; and for Case 3: the base station may not know the grant based scheduling and fail to transmit UL grant to schedule the data in buffer.

Another method is to configure resources with a proprietary sequence. Specifically, the sequence resource is configured (in an information entity which configures the grant free PUSCH), and at least one of the following information of the sequence resource is defined: a starting position of a sequence, which, in an embodiment, is in units of time domain symbols, or an offset between the starting position of the proprietary sequence and a first symbol of the PUSCH is less than M1 symbols, where M1 is an integer, and in an embodiment, the offset being configured to 0 or 1; the number of time domain symbols of a sequence; a cyclic shift or initial cyclic shift of a sequence; a sequence length; an initial RB index; the number of RBs occupied by a sequence; whether a comb structure is adopted for transmission; and a sequence period. Further, the number of time domain symbols for the resource of the sequence is fixed to 1.

Further, the resource of the sequence occupies 1 or 4 RBs, or occupies the same number of RBs as the PUSCH.

Further, the resource of the proprietary sequence has an offset of 0 or 1 from the first symbol of the PUSCH.

Further, transmission of the sequence is triggered only when grant free data to be transmitted exists in the UE.

The benefit of this solution is that the problems in the above Case 1 and Case 2 are avoided. For Case 2, no positive SR will be sent on the proprietary resource, so no problem will occur. For the problem in Case 3, it can also be solved by the solution of this implementation.

In either of the above methods, the PUSCH may be transmitted in a repeated manner. At this point, a characteristic relationship between multiple repetitions of the PUSCH and the sequence resource may be established.

Also, if the PUSCH includes multiple times of repeated transmission, a sequence resource is configured before each of the multiple times of repeated PUSCH resources. Alternatively, a sequence resource is configured only before the first repeated PUSCH resource among multiple times of repeated PUSCH resources. It should be noted that the first PUSCH resource herein is an initial transmission resource among the multiple times of repeated PUSCH resources.

If the sequence resource conflicts with another channel, further definition of related rules is required.

If the sequence resource and/or PUSCH conflicts with another channel, then the another channel is dropped, and the sequence and PUSCH are transmitted; or the another channel is dropped, but all or part of the UCI information on the another channel is carried on the PUSCH for transmission.

Figure 8:
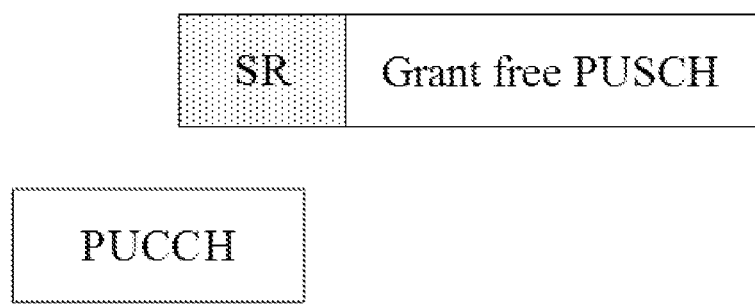
FIG. 8 is a schematic diagram showing a condition of conflicts between different channels according to an embodiment of the present disclosure.

FIG. 8 is a schematic diagram showing the condition of conflicts between different channels according to an embodiment of the present disclosure. If the another channel only conflicts with the sequence, as shown in FIG. 8, the conflicting other channel is dropped, and the sequence resource is transmitted.

Figure 9:
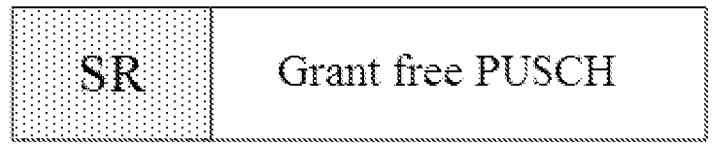
FIG. 9 is another schematic diagram showing a condition of conflicts between different channels according to an embodiment of the present disclosure.
Figure 9:
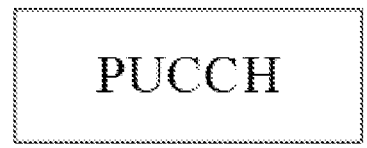

FIG. 9 is another schematic diagram showing the condition of conflicts between different channels according to an embodiment of the present disclosure. If the another channel conflicts with the PUSCH, as shown in FIG. 9, the conflicting another channel is dropped, and the PUSCH resource is transmitted. Optionally, all or part of the UCI information on the another channel is carried on the PUSCH for transmission.

In FIGS. 8 and 9, the sequence resource is represented by SR without loss of generality.

The sequence and the PUSCH are taken as one channel, and further may be taken as a PUSCH channel. Once another channel conflicts with one of the sequence and the PUSCH, a mechanism in the related art is reused to multiplex UCI (if any) carried by the another channel onto data symbols of the grant free PUSCH.

Said another channel includes a physical uplink control channel (PUCCH) that carries information including at least one of: SR, HARQ-ACK and CSI.

In order to meet the transmission requirements of different types of services or to ensure the characteristics of ultra-reliable low latency, multiple sets of resources, called multiple sets of SPS configuration, may be configured for the grant free PUSCH. Each set of SPS configuration corresponds to a grant free PUSCH resource or a group of grant free PUSCH resources.

Further, different sequence resources are configured for the multiple sets of SPS configuration, or one sequence resource is configured for a set of SPS configuration.

Further, in the case where a set of SPS configuration is configured with a group of sequence resources, the sequence resources are the same in configuration information including at least one of:

an initial RB index; the number of the occupied RBs; a sequence cyclic shift; the number of time domain symbols occupied by a sequence; a sequence period; a base sequence of the sequence; and a sequence length.

In this embodiment, there is further provided an apparatus for transmitting a predetermined sequence to implement the above embodiments and preferred implementations; details which have been described will not repeated here. As used herein, the term "module" may be a combination of software and/or hardware that can realize a preset function. The apparatus described in the following embodiment is preferably implemented in software, but hardware, or a combination of software and hardware, is also possible and contemplated.

Figure 10:
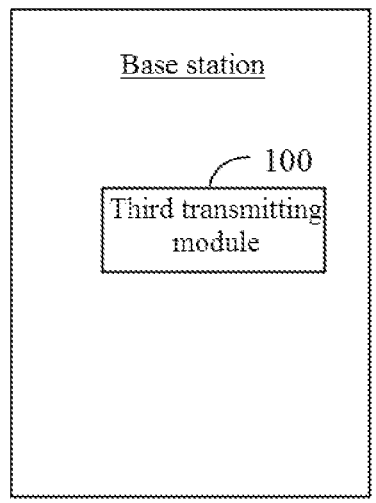
FIG. 10 is a block diagram of an apparatus for transmitting a predetermined sequence according to an embodiment of the present disclosure.

FIG. 10 is a block diagram of an apparatus for transmitting a predetermined sequence according to an embodiment of the present disclosure. As shown in FIG. 10, the apparatus includes: a third transmitting module 100 configured to transmit a predetermined sequence at the same time of transmitting grant free Physical Uplink Shared Channels (PUSCHs), wherein resources of the predetermined sequence and the grant free PUSCHs are in one-to-one or one-to-many correspondence.

Embodiment 4

In an embodiment of the present disclosure, there is further provided a storage medium having a computer program stored thereon, wherein the computer program is configured to be executed to cause steps of any one of the above method embodiments to be implemented.

Optionally, in this embodiment, the storage medium may also be configured to store a computer program for implementing the step of:

S1, transmitting group DCI to a user side, wherein the group DCI includes N bit blocks, and each bit block carries indication information including at least one of: an identifier of a user to be fed back (UE-ID), an identifier of a Hybrid Automatic Repeat reQuest (HARQ) process (HARQ-ID) of the user to be fed back, and a bitmap mapping of K HARQ processes of one user; and the indication information carried in each bit block of the group DCI is configured to indicate feedback information of the corresponding HARQ process.

Optionally, in the embodiment, the storage medium may be configured to store a computer program for implementing the step of: setting bit values corresponding to the UE-ID and/or the HARQ-ID in bit blocks of the group DCI, wherein each bit block includes one UE-ID and at least one HARQ-ID, where N is a positive integer greater than 0, and N is a predefined value or a semi-statically configured value.

Optionally, in the embodiment, the storage medium may be configured to store a computer program for implementing the step of:

S11, transmitting an indication signal to a user side to indicate feedback information, wherein the indication signal is configured to indicate feedback information of an HARQ process of the user to be fed back, the indication signal occupies K resource units, each of the resource units is a resource block (RB), a resource element group (REG) or a resource element group bundle (REG bundle), and K is a positive integer greater than 0.

Optionally, in the embodiment, the storage medium may be configured to store a computer program for implementing the above step, wherein the mapping structure of the indication signal is characterized in that: the occupied resource units are K continuous resource units; or, the K resource units are discrete and discontinuous resource units in a time-frequency domain.

Optionally, in the embodiment, the storage medium may be configured to store a computer program for implementing the above step, wherein the indication signal is composed of A=1 subsequence, and L represents the number of valid resource elements contained in all resource units, wherein the valid resource elements are all remaining resource elements after deducting the resource elements occupied by a demodulation reference signal (DMRS) or all resource elements in all resource units; the indication signal is composed of A=A2 subsequences, and A2 represents the number of time domain symbols occupied by the indication signal, where L represents the number of valid resource elements contained in all resource units of a single symbol, and the valid resource elements are all remaining resource elements after deducting the resource elements occupied by DMRS or all resource elements in all resource units; the signal is composed of A=K subsequences, where L represents the number of valid resource elements contained in a single resource unit, and the valid resource elements are all remaining resource elements after deducting the resource elements occupied by DMRS or all resource elements in all resource units; the signal is composed of A=K/A2 subsequences, where A2 represents the number of time domain symbols occupied by the feedback signal, L represents the number of valid resource elements contained in a single resource unit of a single symbol, and the valid resource elements are all remaining resource elements after deducting the resource elements occupied by DMRS or all resource elements in all resource units.

Optionally, in the embodiment, the storage medium may be configured to store a computer program for implementing the step of:

S21, transmitting a predetermined sequence at the same time of transmitting grant free Physical Uplink Shared Channels (PUSCHs), wherein resources of the predetermined sequence and the grant free PUSCHs are in one-to-one or one-to-many correspondence.

Optionally, in the embodiment, the storage medium may include, but is not limited to: a U disk, a read-only memory (ROM), a random access memory (RAM), a removable hard disk, a magnetic disk or optical disk, and other media that can store a computer program.

In an embodiment of the present disclosure, there is further provided an electronic apparatus, including a memory having a computer program stored thereon and a processor configured to execute the computer program to perform steps of any one of the above method embodiments.

Optionally, the electronic apparatus may further include a transmission device and an input/output device, wherein the transmission device is coupled to the processor, and the input/output device is coupled to the processor.

Optionally, in the embodiment, the processor may be configured to execute the following step via the computer program:

S1, transmitting group DCI to a user side, wherein the group DCI includes N bit blocks, and each bit block carries indication information including at least one of: an identifier of a user to be fed back (UE-ID), an identifier of a Hybrid Automatic Repeat reQuest (HARQ) process (HARQ-ID) of the user to be fed back, and a bitmap mapping of K HARQ processes of one user; and the indication information carried in each bit block of the group DCI is configured to indicate feedback information of the corresponding HARQ process.

Optionally, the processor is further configured to store a computer program for implementing the step of: setting bit values corresponding to the UE-ID and/or the HARQ-ID in bit blocks of the group DCI, wherein each containing one UE-ID and at least one HARQ-ID, where N is a positive integer greater than 0, and N is a predefined value or a semi-statically configured value.

Optionally, the processor is further configured to store a computer program for performing the step of: S11, transmitting an indication signal to a user side to indicate feedback information, wherein the indication signal is configured to indicate feedback information of an HARQ process of the user to be fed back, the indication signal occupies K resource units, each of the resource units is a resource block (RB), a resource element group (REG) or a resource element group bundle (REG bundle), and K is a positive integer greater than 0.

Optionally, the processor is further configured to store a computer program for performing the step of: the indication signal is composed of A=1 subsequence, and L represents the number of valid resource elements contained in all resource units, wherein the valid resource elements are all remaining resource elements after deducting the resource elements occupied by a demodulation reference signal (DMRS) or all resource elements in all resource units; the indication signal is composed of A=A2 subsequences, and A2 represents the number of time domain symbols occupied by the indication signal, where L represents the number of valid resource elements contained in all resource units of a single symbol, and the valid resource elements are all remaining resource elements after deducting the resource elements occupied by DMRS or all resource elements in all resource units; the signal is composed of A=K subsequences, where L represents the number of valid resource elements contained in a single resource unit, and the valid resource elements are all remaining resource elements after deducting the resource elements occupied by DMRS or all resource elements in all resource units; the signal is composed of A=K/A2 subsequences, where A2 represents the number of time domain symbols occupied by the feedback signal, L represents the number of valid resource elements contained in a single resource unit of a single symbol, and the valid resource elements are all remaining resource elements after deducting the resource elements occupied by DMRS or all resource elements in all resource units.

Optionally, the processor is further configured to store a computer program for performing the step of:

S21, transmitting a predetermined sequence at the same time of transmitting grant free Physical Uplink Shared Channels (PUSCHs), wherein resources of the predetermined sequence and the grant free PUSCHs are in one-to-one or one-to-many correspondence.

Specific examples in the present embodiment may refer to the examples described in the foregoing embodiments and alternative implementations, which will not be repeated in the present embodiment.

Obviously, a person skilled in the art would understand that the above modules and steps of the present disclosure can be realized by using a universal computing device, can be integrated in a single computing device or distributed on a network that consists of a plurality of computing devices; and alternatively, they can be realized by using the executable program code of the computing device, so that they can be stored in a storage device and executed by the computing device, in some cases, can perform the shown or described steps in a sequence other than herein, or they are made into various integrated circuit modules respectively, or a plurality of modules or steps thereof are made into a single integrated circuit module, thus to be realized. In this way, the present disclosure is not restricted to any particular hardware and software combination.

The descriptions above are only embodiments of the present disclosure, which are not used to restrict the present disclosure. For those skilled in the art, the present disclosure may have various changes and variations. Any modification, equivalent replacement, improvement and the like made within the principle of the present disclosure should be included in the protection scope of the present disclosure.

What is claimed is:

1. A method for transmitting group downlink control information (DCI), comprising:
    transmitting group Downlink Control Information (DCI) to a user side, wherein the group DCI comprises N bit blocks, and each bit block carries indication information comprising at least one of: an identifier of a user to be fed back (UE-ID), an identifier of a Hybrid Automatic Repeat reQuest (HARQ) process (HARQ-ID) of the user to be fed back, and a bitmap mapping of K HARQ processes of one user; where N is a positive integer greater than 0; and the indication information carried in each bit block of the group DCI is configured to indicate feedback information of an HARQ process corresponding to the indication information;
    wherein before transmitting the group DCI to the user side, the method further comprises:
        setting a bit value corresponding to at least one of the UE-ID and the HARQ-ID in bit blocks of the group DCI, wherein each bit block comprises one UE-ID and at least one HARQ-ID, and N is a predefined value or a semi-statically configured value;

wherein the step of setting a bit value corresponding to at least one of the UE-ID and the HARQ-ID in bit blocks of the group DCI comprises:

selecting P bit blocks for setting at least one of the UE-ID of the user to be fed back and the HARQ-ID of the user to be fed back, and defining the P bit blocks as valid bit blocks, where P is a integer greater than 0; and defining, in the case that P<N, bit blocks except the P bit blocks among the N bit blocks as invalid bit blocks, wherein values of the invalid bit blocks are set by at least one of:

setting each invalid bit block to the same value as at least one valid bit block among the P bit blocks; or setting values of all invalid bit blocks to 0 or 1 or other preset values.

2. The method according to claim 1, wherein the group DCI has a bit size that is an integer multiple of the number of bit blocks N in the group DCI.

3. The method according to claim 1, wherein each bit block comprises M bit fields indicating M HARQ-IDs of one user, where M is a positive integer greater than 0, and M is a predefined value or a semi-statically configured value.

4. The method according to claim 3, wherein a value of M of different users is configured to be the same or different.

5. The method according to claim 3, further comprising: setting one-to-one correspondences between users and indexes of the bit blocks or indexes of the bit fields.

6. The method according to claim 5, wherein the step of setting one-to-one correspondences between users and indexes of the bit blocks or indexes of the bit fields comprises:

configuring the indexes of the bit blocks or the indexes of the bit fields corresponding to the users semi-statically through a radio resource control (RRC) signaling, wherein the indexes of the bit fields comprise the indexes for overall numbers of all bit fields contained in all bit blocks.

7. The method according to claim 1, wherein in the case that the number of invalid bit blocks is greater than 1, a plurality of invalid bit blocks are set to have the same value.

8. The method according to claim 1, wherein the maximum numbers of HARQ processes supported by different users within a single said group DCI are the same, wherein the number of bits occupied by the HARQ-ID is determined by the maximum number of HARQ processes.

9. The method according to claim 8, wherein the indication information carried in each bit block of the group DCI indicates an Acknowledgement (ACK) message of the HARQ process corresponding to the indication information.

10. An apparatus for transmitting group downlink control information (DCI), comprising:

a transmitting module configured to transmit group DCI to a user side, wherein the group DCI comprises N bit blocks, and each bit block carries indication information comprising at least one of: an identifier of a user to be fed back (UE-ID), an identifier of a Hybrid Automatic Repeat reQuest (HARQ) process (HARQ-ID) of the user to be fed back, and a bitmap mapping of K HARQ processes of one user; and N is a positive integer greater than 0; and the indication information carried in each bit block of the group DCI is configured to indicate feedback information of the corresponding HARQ process;

wherein each bit block comprises a bitmap mapping of M processes of one user, wherein each process corresponds to 1 bit in the bitmap mapping;

wherein the transmitting module is further configured to: set bit values of the bitmap mapping in the bit blocks of the group DCI;

wherein setting bit values of the bitmap mapping in the bit blocks of the group DCI comprises:

selecting P bit blocks for setting a receiving state value corresponding to the HARQ process of the user to be fed back, and defining the P bit blocks as valid bit blocks;

defining, in the case that P<N, bit blocks except the P bit blocks among the N bit blocks as invalid bit blocks, wherein values of the invalid bit blocks are set by at least one of:

setting each invalid bit block to the same value as at least one valid bit block among the P bit blocks; or setting values of all invalid bit blocks to 0 or 1 or other preset values.

11. A method for transmitting group downlink control information (DCI), comprising:

transmitting group Downlink Control Information (DCI) to a user side, wherein the group DCI comprises N bit blocks, and each bit block carries indication information comprising at least one of: an identifier of a user to be fed back (UE-ID), an identifier of a Hybrid Automatic Repeat reQuest (HARQ) process (HARQ-ID) of the user to be fed back, and a bitmap mapping of K HARQ processes of one user; where N is a positive integer greater than 0; and the indication information carried in each bit block of the group DCI is configured to indicate feedback information of an HARQ process corresponding to the indication information;

wherein each bit block comprises a bitmap mapping of M processes of one user, wherein each process corresponds to 1 bit in the bitmap mapping;

wherein the method further comprises: setting bit values of the bitmap mapping in the bit blocks of the group DCI; and wherein the step of setting bit values of the bitmap mapping in the bit blocks of the group DCI comprises:

selecting P bit blocks for setting a receiving state value corresponding to the HARQ process of the user to be fed back, and defining the P bit blocks as valid bit blocks; and defining, in the case that P<N, bit blocks except the P bit blocks among the N bit blocks as invalid bit blocks, wherein values of the invalid bit blocks are set by at least one of:

setting each invalid bit block to the same value as at least one valid bit block among the P bit blocks; or setting values of all invalid bit blocks to 0 or 1 or other preset values.

12. A non-transitory computer-readable storage medium storing a computer program thereon, wherein the computer program is configured to be executed to cause the method of claim 11 to be implemented.

13. An electronic apparatus, comprising a memory and a processor, wherein the memory has a computer program stored thereon, and the processor is configured to execute the computer program to implement the method of claim 11.

14. The method according to claim 11, wherein a value of M of different users is configured to be the same or different.

15. The method according to claim 11, further comprising:
   setting one-to-one correspondences between users and indexes of the bit blocks or indexes of the bit fields.

16. The method according to claim 11, wherein in the case that the number of invalid bit blocks is greater than 1, a plurality of invalid bit blocks are set to have the same value.

\* \* \* \* \*